United States Patent
Stähle et al.

[11] Patent Number: 6,076,560
[45] Date of Patent: Jun. 20, 2000

[54] POOL CLEANER HOSE WEIGHT

[75] Inventors: Manfred Stähle; Dieter H F Kallenbach, both of Sandton, South Africa

[73] Assignee: Corrupipe CC, South Africa

[21] Appl. No.: 09/300,401

[22] Filed: Apr. 27, 1999

[30] Foreign Application Priority Data

Apr. 30, 1998 [ZA] South Africa ............................ 98/3652
Jul. 15, 1998 [ZA] South Africa ............................ 98/6268

[51] Int. Cl.[7] ...................................................... F16L 9/18
[52] U.S. Cl. .................... 138/112; 138/110; 138/DIG. 11
[58] Field of Search .................................... 138/112, 106, 138/110, DIG. 11

[56] References Cited

U.S. PATENT DOCUMENTS

| | | | |
|---|---|---|---|
| 220,954 | 10/1879 | Atterbury | 138/108 |
| 2,229,849 | 1/1941 | Heidebrecht | 138/110 |
| 4,088,880 | 5/1978 | Walsh | 362/96 |
| 4,122,298 | 10/1978 | Brandt | 138/112 |
| 4,205,707 | 6/1980 | Lundgren | 138/96 R |
| 4,398,772 | 8/1983 | Odell | 138/110 |
| 4,473,967 | 10/1984 | Poirot | 43/100 |
| 4,753,256 | 6/1988 | Chivens et al. | 138/103 |
| 5,082,028 | 1/1992 | Jean-Jacques | 138/106 |
| 5,195,563 | 3/1993 | Brooks | 138/103 |
| 5,524,672 | 6/1996 | Mosing et al. | 138/110 |
| 5,893,362 | 4/1999 | Evans | 128/201.11 |

*Primary Examiner*—James Hook
*Attorney, Agent, or Firm*—Banner & Witcoff, Ltd.

[57] ABSTRACT

The invention provides a weight to be used to submerge the hose used with swimming pool cleaners and which may be variably positioned at any position along the length of the hose, the weight having an annular metal member encased in plastics material with the plastics material also providing an inwardly directed radial flange to engage in the recesses between the corrugations of the hose.

5 Claims, 1 Drawing Sheet

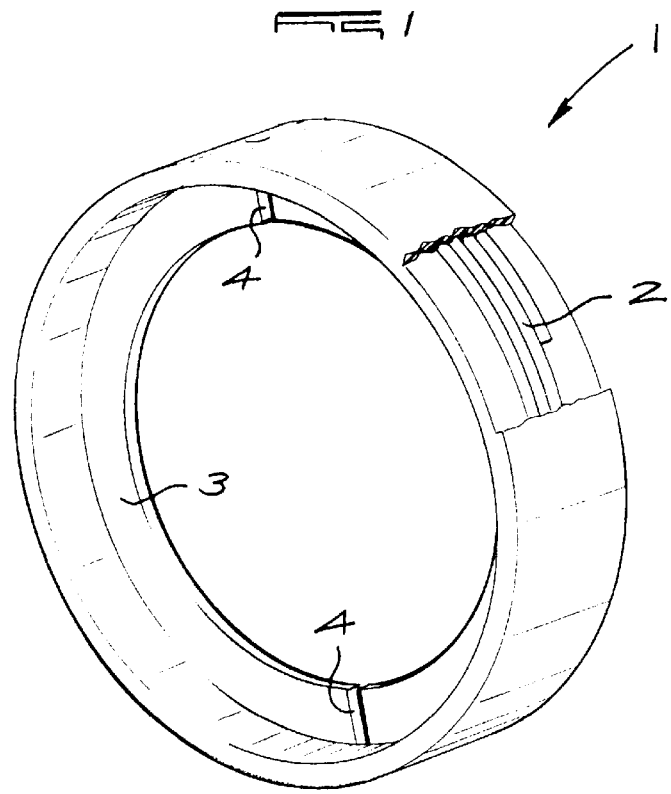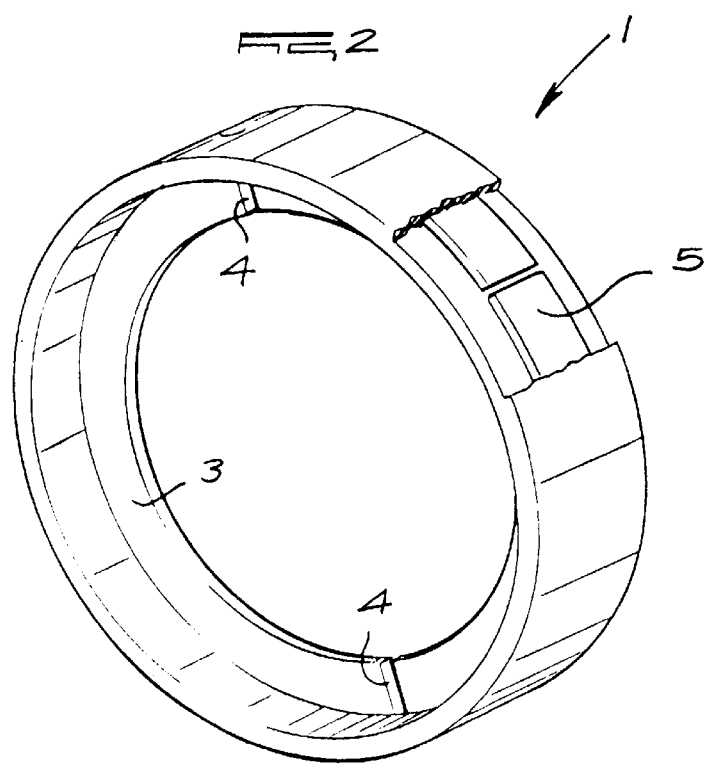

POOL CLEANER HOSE WEIGHT

FIELD OF THE INVENTION

This invention relates to weights used to control the submergence of flexible hose used to connect automatic pool cleaners to the intake to pool filtration plants.

BACKGROUND TO THE INVENTION

Plastic hose used with swimming pool cleaners are commonly of lower specific gravity than the water in which they operate and tend to float on the surface of the pool being cleaned. This is undesirable for many reasons not the least of which is the tendency for air to be drawn into the filtration system. This can result in damage to the filtration plant as well as in inefficient operation of the automatic swimming pool cleaner. The weights are an important adjunct to the proper effective operation of the pool cleaning equipment.

Heretofore these weights have come in various kinds. Some have been moulded of plastics material heavily loaded with filler material to give weight to the resin. In order to provide sufficient weight these articles usually become undesirably bulky.

The most common weights are made by annular envelopes of plastics material in which are positioned steel or lead rings which in some instances are split. The weight giving material is at all times in contact with the water in which it is used.

Lead is undesirable for use in chlorinated water for swimming pools and steel rings rust unless made from stainless steel bands.

OBJECT OF THE INVENTION

It is the object of the present invention to provide a hose weight which is more convenient to use than those presently available.

SUMMARY OF THE INVENTION

According to this invention there is provided a pool hose weight comprising an annular metal ring encased in plastics material to include a radially and inwardly directed flange.

Further features of this invention provide for the annular metal member to be a wire coil or a single ring of metal and for the ring to be cut from coils formed from rods or flat bars.

The invention also provides for the flange to have at least one radial slit therein.

These and other features of this invention will become apparent from the following description of preferred embodiments in which reference is made to the accompanying drawings.

BRIEF DESCRIPTION OF THE DRAWINGS

In the drawings

FIG. 1 shows an oblique view partly in section of a weight including a coiled wire annular member; and FIG. 2 shows a similar view of weight using a single ring of metal.

DETAILED DESCRIPTION WITH REFERENCE TO THE DRAWINGS

Referring to FIG. 1 the weight (1) consists of a coil of stainless steel wire (2) encased in polyethylene or other suitable plastics material. The coil is encased by a moulding operation. The coil (2) is supported in the mould on pins and the plastics material introduced into the mould to embed the coil. It will be appreciated that the number of turns in the coil used will essentially determine the weight of the final product. Thus different weights can be provided in the same size of moulding.

The ring which results from the moulding is made to a diameter which will thread over the outside of a pool hose. To accurately locate and retain the weight in position a radially inwardly directed flange (3) forms part of the moulding. While resilient, this flange has an inherent stiffness and is designed to engage in the recesses of the corrugated configuration of the standard kinds of pool hose available.

For those hoses that are made with the corrugations as continuous spirals the flange (3) can be flexed to move the weight along the hose in threaded engagement therewith.

Where the hose is of the kind in which the corrugations are formed separately and normal to the axis of the hose, the flange (3) will be provided with radially extending slits (4).

These slits (4) will preferably be located at the positions where the pins support the coil in the mould. The slits enable the weights to be forced over the corrugations along the length of the hose to locate the weight in the desired position.

It will be appreciated by those skilled in the art that the coils will be exposed through the encasing plastics where they are supported on the pins during the moulding operation. If it is necessary for any reason that the coil be completely embedded in the plastics material, this can be achieved by a two-shot moulding process. The latter process will enable a wider range of metals to be used in the weights without damage to the metal or contamination of the water in which the weight is to be used.

FIG. 2 illustrates the use of a single ring (5) of metal formed from a flat bar. While the rings can be obtained from any convenient source, preferably flat bar or cut steel plate will be used. Different widths and thicknesses of bar or plate will give different desired weights.

The hose weight will be manufactured as described with reference to FIG. 1 and the metal will be chosen dependant on whether or not a two stage moulding to encase the ring takes place or only a single stage process.

The pool hose weight made according to the invention is easy and effective to use and can readily be supplied in different weights to meet particular requirements.

What I/we claim as new and desire to secure by Letters Patent is:

1. A pool hose weight comprising an annular metal member encased in continuous plastics material, and a radially and inwardly directed resilient flange spaced from perpheral edges of the hose weight along a width of the member.

2. A pool hose weight as claimed in claim 1 in which the radial flange has at least one radial split therein.

3. A pool hose weight as claimed in claim 1 in which the annular metal member is a wire coil.

4. A pool hose weight as claimed in claim 1 in which the annular member is a single ring of metal.

5. A pool weight as claimed in claim 4 in which the ring is cut from flat bar.

* * * * *